United States Patent [19]

Dhein et al.

[11] 4,400,489
[45] Aug. 23, 1983

[54] AERIALLY-CROSSLINKING POLYACRYLATE COATING AGENTS

[75] Inventors: Rolf Dhein; Lothar Fleiter, both of Krefeld, Fed. Rep. of Germany

[73] Assignee: Bayer Aktiengesellschaft, Leverkusen, Fed. Rep. of Germany

[21] Appl. No.: 323,763

[22] Filed: Nov. 23, 1981

[30] Foreign Application Priority Data

Nov. 27, 1980 [DE] Fed. Rep. of Germany ....... 3044695

[51] Int. Cl.$^3$ ......................... C09D 3/727; C09D 3/80
[52] U.S. Cl. .................................................. 525/301.5
[58] Field of Search ...................................... 525/301.5

[56] References Cited

U.S. PATENT DOCUMENTS

| | | | |
|---|---|---|---|
| 4,129,537 | 12/1978 | Dhein et al. | 525/301.5 |
| 4,146,519 | 3/1979 | Dhein et al. | 525/301.5 |
| 4,186,116 | 1/1980 | Dhein et al. | 524/313 |

FOREIGN PATENT DOCUMENTS

| | | | |
|---|---|---|---|
| 767476 | 2/1957 | United Kingdom | 525/301.5 |
| 793776 | 4/1958 | United Kingdom | 525/301.5 |
| 1227398 | 4/1971 | United Kingdom | 525/301.5 |

OTHER PUBLICATIONS

"Chemical Abstracts", vol. 90, p. 74, No. 40304s (Feb. 5, 1979).

*Primary Examiner*—Ronald W. Griffin
*Attorney, Agent, or Firm*—Connolly and Hutz

[57] ABSTRACT

The invention relates to an aerially-crosslinking, pigmented or non-pigmented coating agent consisting of conventional lacquer auxiliaries and an aerially-crosslinking binder which has been reacted to form a dicarboxylic acid semi-ester by the reaction of a copolymer consisting of copolymerized units of at least one ester carrying at least one 1,2-epoxide group or hydroxyl group of an $\alpha,\beta$-monoolefinically unsaturated $C_3$–$C_5$-carboxylic acid and at least one vinyl or vinylidene monomer which is different therefrom with at least one drying fatty acid and optionally with at least one cyclic dicarboxylic acid anhydride, characterized in that the coating agent contains as an additional lacquer auxiliary from 0.2 to 2% by weight of at least one $\alpha$-dicarbonyl compound, based on the aerially-crosslinking binder.

7 Claims, No Drawings

AERIALLY-CROSSLINKING POLYACRYLATE COATING AGENTS

This invention relates to aerially-cross-linking polyacrylate coating agents which, in addition to the polyacrylate binder which contains, condensed therein, portions of conjugated unsaturated fatty acids and optionally carboxylic acid semi-ester groups, also contain conventional lacquer auxiliaries and β-dicarbonyl compounds.

Great significance is also attributed to polyacrylates as binders in lacquers which dry at room temperature. These binders are usually lacquer crude materials which do not become free from tackiness by chemical cross-linking, but they produce a non-tacky and resistant coating merely by the evaporation of the solvents. There have been numerous attempts to cross-link chemically the polyacrylates drying at room temperature in order to render these systems also more resistant to external influences.

Thus, it is known to react copolymers consisting of glycidylacrylate or glycidylmethacrylate and vinyl or vinylidene monomers with drying fatty acids and to use them as aerially-drying lacquer binders. The term "vinyl or vinylidene monomers" is understood to include vinyl toluene, acrylonitrile, methacrylonitrile and acrylates and methacrylates; (see British Pat. No. 793,776).

Furthermore, according to German Pat. No. 1,720,697, equivalent to British Pat. No. 1,227,398, copolymers are produced from at least one vinyl monomer such as styrene and (meth)acrylates and at least one comonomer containing epoxide groups. The copolymers are esterified with drying fatty acids and the hydroxyl groups formed during esterification are reacted with a dicarboxylic acid anhydride to form semi-ester groups, whereby in order to achieve a high pigment wetting, acid numbers of from approximately 20 to approximately 60, based on the binder are required.

Particularly favourable characteristics in terms of the lacquer are obtained when the aerially-cross-linking lacquer binders are produced from copolymers of copolymerised units of the following:
    from 20 to 55% by weight of styrene,
    from 5 to 45% by weight of glycidylacrylate or glycidylmethacrylate and
    optionally up to 50% by weight of at least one acrylate or methacrylate having from 1 to 10 carbon atoms in the alcohol component,
which are esterified up to an acid number of <10 with from 22 to 50% by weight of drying fatty acids, based on the copolymer and drying fatty acids and dicarboxylic acid anhydride, and the hydroxyl groups formed during esterification are then reacted with dicarboxylic acid anhydride, whereby the following are used as drying fatty acids, based on the copolymer and drying fatty acids and dicarboxylic acid anhydride:
    optionally up to 15% by weight of natural drying fatty acids and
    from 10 to 50% by weight of isomerised drying fatty acids,
the total of the percentage content amounting to from 22 to 50% by weight, and whereby from 30 to 75% by weight of the isomerised, drying fatty acids contain conjugated double bonds and the dicarboxylic acid anhydrides consist of from 0.5 to 3% by weight, based on the total components of the binder, of tetrahydrophthalic acid anhydride or the isomers thereof or mixtures of these anhydrides (see German Offenlegungsschrift No. 2,647,314 equivalent to U.S. Pat. No. 4,129,537).

Aerially-cross-linking lacquer binder of copolymers consisting of copolymerised units of the following:
    from 5 to 40% by weight of styrene,
    from 10 to 50% by weight of at least one hydroxyalkylacrylate or hydroxyalkyl methacrylate having from 2 to 4 carbon atoms in the alkyl group, and
    from 10 to 50% by weight of at least one acrylate or methacrylate having from 1 to 10 carbon atoms in the alcohol component, esterified with:
    from 10 to 50% by weight of drying fatty acids, based on the copolymer and drying fatty acids, and dicarboxylic acid anhydride,
also belong to this prior art (see German Offenlegungsschrift No. 2,728,568 equivalent to U.S. Pat. No. 4,186,116), whereby from 10 to 70 mol % of the hydroxyl groups of the incorporated hydroxyalkylacrylate or hydroxyalkyl methacrylate units are esterified with drying fatty acids and from 0.5 to 20 mol % of the hydroxyl groups of the incorporated hydroxyalkylacrylate or hydroxyalkyl methacrylate units are then reacted with from 0.5 to 10% by weight, based on the lacquer binder, of at least one cyclic dicarboxylic acid anhydride to form the semi-ester of the corresponding dicarboxylic acid having a total acid number of from 5 to 30 and whereby the total acid number is composed of an acid number of from 1 to 10, determined after esterification with the drying fatty acids and originating from free fatty acids, and of an acid number of from 1 to 29, determined in a solvent-free lacquer binder (end product) and originating from the semi-ester formation.

However, the prior art binders still have disadvantages which complicate their use in specific areas, e.g. in automobile repair lacquering. Since automobile repair lacquering frequently has to be carried out under spatially difficult conditions, it often occurs that after the repair lacquering has dried, the surface of the lacquer exhibits defects due to a mechanical influence or due to the presence of impurities in the ambient air. These defects are then usually eliminated in that they and their surroundings are re-lacquered using the same lacquer. The technical term for this method is "overlacquering".

Unfortunately, the overlacquering operation of aerially-dried polyacrylates of the type discussed is impossible in specific phases of the lacquer drying process, as verified by the experimental part of this application. The overlacquered film does not dry to a form which is free from cracks and incrustations. It may draw up, or a softening may occur, or other film irregularities take place, such as an irregular surface, reduced gloss and mat areas. Although, as emerges from the following Comparative Experiments 1 and 2 of this application, films produced from the aerially-drying polyacrylates are already dry after 20 minutes so that dust does not stick and are non-tacky after 1.5 hours, these films may only be overlacquering of these films can only be carried out, without the lacquer surface being visibly damaged after a period of 48 hours. Such a long waiting time until the aerially-cross-linked polyacrylate film can be overlacquered is uneconomic and therefore unacceptable.

Thus, the object of the present invention is to provide aerially-cross-linking polyacrylate coating agents which have the known lacquer-covering characteristics of this class of coating agents and in addition thereto, are susceptible to a substantially improved overlacquering.

The object is achieved in that the known aerially-cross-linking polyacrylate coating agents which contain as binders reaction products of copolymers consisting of copolymerised units of acrylates and/or methacrylates containing 1,2-epoxide groups or hydroxyl groups and other vinyl or vinylidene monomers with drying fatty acids, and optionally cyclic dicarboxylic acid anhydrides, for the purpose of carboxylic acid semi-ester formation, are also mixed with small quantities of at least one $\beta$-dicarbonyl compound.

Thus, the invention provides an aerially-cross-linking, pigmented or non-pigmented coating agent consisting of conventional lacquer auxiliaries and an aerially-cross-linking binder which has been reacted to form a dicarboxylic acid semi-ester by the reaction of a copolymer of copolymerised units of at least one ester carrying at least one 1,2-epoxide group or hydroxyl group, of an $\alpha,\beta$-monoolefinically unsaturated $C_3-C_5$-carboxylic acid and at least one vinyl or vinylidene monomer which is different therefrom with at least one drying fatty acid and optionally at least one cyclic dicarboxylic acid anhydride, characterised in that the coating agent contains as an additional lacquer auxiliary from 0.2 to 2% by weight of at least one $\beta$-dicarbonyl compound, based on the aerially-cross-linking binder.

The previously mentioned aerially-drying binders are known, for example from British Pat. Nos. 767,476; 793,776, German Pat. No. 1,720,697 (=British Pat. No. 1,227,398), German Offenlegungsschrift Nos. 2,647,314 (=U.S. Pat. No. 4,129,537), 2,706,106 (=U.S. Pat. No. 4,146,519), 2,247,146 (=British Pat. No. 1,399,159), 2,728,568 (=U.S. Pat. No. 4,186,116) and German Patent Application No. P 29 34 950.6.

Esters having at least one 1,2-epoxide group, of an $\alpha,\beta$-monoolefinically unsaturated $C_3-C_5$-carboxylic acid include the following, for example: glycidyl acrylate, glycidyl methacrylate, fumaric acid bis glycidyl ester, maleic acid bis glycidyl ester, preferably glycidyl (meth)acrylate.

The following are mentioned as esters having at least one hydroxyl group, of an $\alpha,\beta$-monoolefinically unsaturated $C_3-C_5$-carboxylic acid: hydroxyalkyl (meth)acrylate having from 2 to 4 carbon atoms in the alkyl moiety, e.g. 2-hydroxy-ethyl(meth)acrylate, 2-hydroxylpropyl(meth)acrylate, 4-hydroxy butyl(meth)acrylate; trimethylolpropanemono(meth)acrylate and pentaerythrite-mono(meth)-acrylate or mixtures thereof. Hydroxyalkyl-(meth)acrylate having from 2 to 4 carbon atoms in the alkyl moiety is preferred.

The following are mentioned, for example, as vinyl or vinylidene monomers: styrene, $\alpha$-methylstyrene, o- or p-chlorostyrene, o-, m or p-methylstyrene, p-tert.-butylstyrene and optionally mixtures thereof, acrylic- and methacrylic acid alkylesters having from 1 to 10 carbon atoms in the alcohol component, for example ethylacrylate, methylacrylate, n- or iso-propylacrylate, n-butylacrylate, 2-ethylhexylacrylate, 2-ethylhexylmethacrylate, isooctylacrylate, decylacrylate, tert.-butylacrylate, methylmethacrylate, ethylmethacrylate, n- or iso-propylmethacrylate, butylmethacrylates, iso-octylmethacrylate, decylmethacrylate and optionally mixtures thereof; diesters of fumaric acid, itaconic acid, maleic acid having from 4 to 8 carbon atoms in the alcohol component; acrylonitrile, (meth)acrylic acid amide, vinylesters of alkane monocarboxylic acids having from 2 to 5 carbon atoms, such as vinylacetate or vinylpropionate, or mixtures of the above-mentioned monomers and N-methoxy-methyl(meth)acrylic acid amide.

Styrene and (meth)acrylic acid alkyl esters having from 1 to 10 carbon atoms in the alcohol component and mixtures thereof are the preferred vinyl or vinylidene monomers.

The term "drying fatty acids" is understood to mean natural drying and isomerised drying fatty acids. German Offenlegungsschrift No. 2,647,317 (equivalent to U.S. Pat. No. 4,129,537) provides a survey on these drying fatty acids. The drying fatty acids are contained condensed in, in quantities of from approximately 20 to 50% by weight of binder.

After the reaction of the copolymer containing epoxide groups with drying fatty acids, the hydroxyl groups formed from this reaction may still be partly or completely converted into the corresponding semi-esters with cyclic dicarboxylic acid anhydrides.

In the case of copolymers which contain hyroxyl groups but are free from epoxide groups, from 10 to 70 mol % of the hydroxyl groups are esterified with drying fatty acids and from 0.5 to 20 mol % of the hydroxyl groups of the incorporated hydroxyalkyl(meth)acrylate units are then reacted with from 0.5 to 10% by weight, based on the lacquer binder, of at least one cyclic dicarboxylic acid anhydride into the semi-ester of the corresponding dicarboxylic acid having a total acid number of preferably from 5 to 30, and whereby the total acid number is composed of an acid number of from 1 to 10, determined after esterification with the drying fatty acids and originating from free fatty acids, and of an acid number of from 1 to 29, determined in a solvent-free lacquer binder (end product) and originating from the semi-ester formation.

Suitable cyclic dicarboxylic acid anhydrides include the following, for example: succinic acid anhydride, maleic acid anhydride, phthalic acid anhydride, tetrahydrophthalic acid anhydride, hexahydrophthalic acid anhydride, methylhexahydrophthalic acid anhydride, endomethylenetetrahydrophthalic acid anhydride, halogenated phthalic acid anhydrides, such as tetrachlorophthalic acid anhydride, tetrabromophthalic acid anhydride; 1,4,5,6,7,7-hexachlorobicyclo(2,2,1)-heptene-5-dicarboxylic acid(2,3)-anhydride and diglycolic acid anhydride. Tetrahydrophthalic acid anhydride, or the isomers thereof, or a mixture of these anhydrides is preferably used.

Aerially-cross-linking lacquer binders according to German Offenlegungsschrift No. 2,647,317 (equivalent to U.S. Pat. No. 4,129,537), are particularly preferred discussed in the statements of this application concerning the prior art relating to aerially-drying lacquer binders based on acrylate, are particularly preferred.

$\beta$-Dicarbonyl compounds which are to be used according to the invention include the following, for example: acetyl acetone, acetoacetic acid ester, acetyl cyclopentanone, oxalyl-N-methylpyrrolidone and acetyl butyrolactone.

Acetyllactones are particularly preferred, e.g. $\alpha$-acetyl-$\gamma$-butyrolactone:

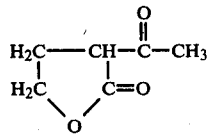

The β-dicarbonyl compounds are contained in the coating agent in quantities of from 0.2 to 2% by weight, preferably from 0.5 to 1.5% by weight, based on the binder.

In addition to the binder and the β-dicarbonyl compounds to be used according to the invention, the coating agents claimed also contain one or more of the conventional lacquer auxiliaries in conventional quantities.

Conventional lacquer auxiliaries are the following, for example:

solvents such as xylene, solvent naphtha, aromatics mixtures, ethylglycol acetate, mineral spirit, turpentine oil in quantities of from 1 to 100% by weight, based on the binder;

flowing agents such as silicone fluids, in quantities of from 0.5 to 5% by weight, based on the binder;

siccatives such as cobalt, lead manganese, calcium, zirconium and/or iron compounds in the form of the salts thereof with, for example, naphthenic acids, octanoic acids, decanoic acids in quantities of from 0.05 to 2% by weight, based on the binder;

Membrane preventatives such as k aldoximes or ketoximes, for example butanonoxime, in quantities of from 0.1 to 2.0% by weight, based on solid binder.

In addition to the conventional lacquer auxiliaries, the coating agents may also contain pigments such as titanium dioxide, iron oxides, zinc oxides, chromium oxides, zinc sulphide, chromates such as zinc, lead or strontium chromate, lead chromate, lithopone, organic pigments such as phthalocyanine pigments or insoluble azo dyes in quantities of from 10 to 100% by weight, based on the binder.

The expression "based on the binder" always means a solvent-free binder (100%).

The coating agents according to the invention may also be combined with other resins in order to vary the final film characteristics.

The production of the lacquer films and overlacquering may be effected by conventional methods such as coating, spraying, immersing, doctoring etc., on suitable substrates made, for example, of metal, wood, paper, glass, ceramics, stone, concrete and plastics etc. Drying generally takes place at a temperature of from 15° to 30° C. However, lower or higher drying temperatures may also be used.

The percentage contents and parts specified in the Examples relate to the weight, unless indicated otherwise.

EXAMPLE 1

100 parts of a copolymer, consisting of copolymerised units of 43.7% by weight of styrene, 22.6% by weight of methylmethacrylate, 1.8% by weight of butylacrylate and 31.9% by weight of glycidyl methacrylate and produced in xylene by conventional copolymerisation using peroctoate and dodecyl mercaptan as the chain-terminator at 110° C. are esterified with 62.5 parts of isomerised, drying fatty acids [composition of the isomerised, drying fatty acid mixture:

- 16% of saturated fatty acids ($C_8$–$C_{18}$-fatty acids: (caprylic, lauric, myristic, palmitic and stearic acid)
- 25% of mono-unsaturated $C_{18}$-fatty acid (oleic acid)
- 58% of di-unsaturated $C_{18}$-fatty acid, whereby from 48 to 52% of the unsaturated fatty acids are conjugated (9.11 and 9.12-linoleic acid)
- 1% of tri-unsaturated $C_{18}$-fatty acid (linolenic and elaiostearic acid], at 135° C. up to an acid number of 6.0 mg KOH/g substance and are then esterified with 1.0 part of tetrahydrophthalic acid anhydride at 120° C., so that when the reaction is completed, a semi-ester having an acid number of 8 mg KOH/g substance is produced. The resulting binder in xylene has a copolymer content of 57%, a content of isomerised drying fatty acids of approximately 38% and a viscosity according to DIN 53 211 of from 80 to 90 (seconds) (40% in xylene).

1.0 part of α-acetyl-γ-butyrolactone, based on the binder, is added to a white lacquer, produced from the following:

- 175.5 parts of the above binder solution (57% in xylene),
- 65.5 parts of titanium dioxide (rutile type),
- 75.5 parts of xylene,
- 2.5 parts of Ca-octoate solution (in white spirit 4% metal content),
- 1.7 parts of Co-octoate solution (in white spirit 6% metal content),
- 1.2 parts of flowing agent, silicone fluid solution 1% in xylene, and
- 1.5 parts of methylethylketoxime approximately 55% solution in white spirit.

The results of the test in terms of the lacquer, in particular the results of the test of the overlacquering ability may be seen in the Table.

Before the overlacquering step, in the present case by overspraying, the above white lacquer is adjusted with xylene to a viscosity of 20" (according to DIN 53 211).

COMPARATIVE EXPERIMENT 1

A white lacquer based on a binder according to Example 1, but without the addition of α-acetyl-γ-butyrolactone. See the Table for the results.

COMPARATIVE EXPERIMENT 2

A white lacquer according to claim 1, but with double the quantity of cobalt octoate to accelerate drying, but without the addition of α-acetyl-γ-butyrolactone. See the Table for the results.

TABLE

| | DRYING TIME | | OVERSPRAYABILITY AFTER: | | | | | |
|---|---|---|---|---|---|---|---|---|
| | DRY SO THAT DUST DOES NOT STICK* | NON-TACKY* | 2h | 4h | 8h | 16h | 24h | 48h |
| Example 1 | 20' | 1.5h | 4 | 5 | 5 | 0 | 0 | 0 |
| Comparative Experiment 1 | 20' | 1.5h | 4 | 5 | 5 | 4 | 3 | 0 |
| Comparative | 20' | 1.5h | 4 | 5 | 5 | 4 | 4 | 0 |

| | DRYING TIME | | OVERSPRAYABILITY AFTER: | | | | | |
|---|---|---|---|---|---|---|---|---|
| | DRY SO THAT DUST DOES NOT STICK* | NON-TACKY* | 2h | 4h | 8h | 16h | 24h | 48h |
| Experiment 2 | | | | | | | | |

*determined by touching the film with the index finger.

EXPLANATIONS TO THE TABLE

Layer thickness of the dried film to be overlacquered: 50 μm, rubbed when wet with 400 abrasive paper. Layer thickness of the dried film obtained by overlacquering: 50 μm. Substrate: body sheets. Drying takes place at t=20° C. and 60% relative air humidity.

Assessment of the oversprayability:
0=very good, no visible disturbances,
1=very good, temporary haze,
2=good, temporary initial swelling,
3=satisfactory, initial swelling, partly receding,
4=unsatisfactory, started to swell considerably,
5=unsatisfactory, started to swell considerably, very irregular surface.

We claim:

1. An aerially-cross-linking coating agent comprising an aerially-cross-linking binder comprising a dicarboxylic acid semi-ester formed by the reaction of a copolymer consisting of copolymerised units of at least one ester carrying at least one 1,2-epoxide group or hydroxyl group of an α,β-monoolefinically unsaturated $C_3$–$C_5$-carboxylic acid and at least one vinyl or vinylidene monomer which is different therefrom with at least one drying fatty acid wherein the coating agent contains as an additional lacquer auxiliary from 0.2 to 2% by weight of at least one β-dicarbonyl compound, based on the aerially-cross-linking binder.

2. An aerially-cross-linking coating agent according to claim 1, wherein at least one cyclic dicarboxylic acid anhydride is reacted to form the semi-ester.

3. An aerially-cross-linking coating agent according to claim 1, wherein the aerially-cross-linking binder is a copolymer consisting of copolymerised units of the following:
from 20 to 55% by weight of styrene,
from 5 to 45% by weight of glycidyl acrylate, and/or glycidyl methacrylate and from 0 to 50% by weight of at least one acrylate and/or methacrylate having from 1 to 10 carbon atoms in the alcohol component, which is esterified to an acid number of 10 with from 22 to 50% by weight of at least one drying fatty acid, based on the total copolymer, drying fatty acid and dicarboxylic acid anhydride, whereby the hydroxyl groups formed during this reaction are then reacted with a dicarboxylic acid anhydride.

4. An aerially-cross-linking coating agent according to claim 3, wherein the, at least one drying fatty acid comprises, based on the total copolymer, drying fatty acid and dicarboxylic acid anhydride: from 0 to 15% by weight of at least one natural, drying fatty acid, and from 10 to 50% by weight of at least one isomerised, drying fatty acid, the total percentage content being from 22 to 50% by weight, and whereby from 30 to 75% by weight of the isomerised, drying fatty acid or acids contain conjugated double bonds, and the dicarboxylic acid anhydride or anhydrides consist of from 0.5 to 3% by weight, based on the total components of the binder, of tetrahydrophthalic acid anhydride or an isomer thereof or a mixtures of these anhydrides.

5. An aerially-cross-linking coating agent according to claim 1, wherein the β-dicarbonyl compound is α-acetyl-γ-butyrolactone.

6. An aerially-cross-linking coating agent according to claim 1 which is pigmented.

7. The aerially-cross-linking coating agent of claim 1 wherein the at least one β-dicarbonyl compound is selected from the group consisting of acetyl acetone, acetoacetic acid ester, acetyl cyclopentanone, oxalyl-N-methylpyrrolidone and acetyl butyrolactone.

* * * * *